(12) United States Patent
Conner et al.

(10) Patent No.: US 12,030,120 B2
(45) Date of Patent: Jul. 9, 2024

(54) SYSTEM AND METHOD FOR POWDER DETECTION IN PART

(71) Applicant: Honeywell Federal Manufacturing & Technologies, LLC, Kansas City, MO (US)

(72) Inventors: Brett Page Conner, Lee's Summit, MO (US); Benjamin Ross Brown, Lee's Summit, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 253 days.

(21) Appl. No.: 17/540,926

(22) Filed: Dec. 2, 2021

(65) Prior Publication Data
US 2023/0173582 A1   Jun. 8, 2023

(51) Int. Cl.
*B22F 10/68*     (2021.01)
*B22F 12/90*     (2021.01)
*B33Y 40/20*     (2020.01)

(52) U.S. Cl.
CPC .............. *B22F 10/68* (2021.01); *B22F 12/90* (2021.01); *B33Y 40/20* (2020.01)

(58) Field of Classification Search
None
See application file for complete search history.

(56) References Cited

U.S. PATENT DOCUMENTS

| | | | |
|---|---|---|---|
| 10,444,110 | B2 | 10/2019 | Hartwig et al. |
| 2008/0294354 | A1 | 11/2008 | Zhu et al. |
| 2015/0314373 | A1 | 11/2015 | Mironets et al. |
| 2017/0097280 | A1 | 4/2017 | Drescher et al. |
| 2018/0207876 | A1* | 7/2018 | Querol Esparch .... B29C 64/295 |
| 2020/0262147 | A1* | 8/2020 | Mamrak ............... B29C 64/343 |

OTHER PUBLICATIONS

Non-Final Office Action mailed Feb. 12, 2019 in related U.S. Appl. No. 14/941,258, 10 pages.

* cited by examiner

*Primary Examiner* — Eric W Golightly
(74) *Attorney, Agent, or Firm* — Hovey Williams LLP

(57) ABSTRACT

A system and method of testing a part manufactured using an additive manufacturing process. The part may be excited via an input mechanism that imparts an excitation force on the part to induce a dynamic response in the part. An output mechanism may be used to sense the dynamic response in the part. A processing element may be used to compare the dynamic response with a reference to identify an indication of excess powder in the part.

12 Claims, 2 Drawing Sheets

SYSTEM AND METHOD FOR POWDER DETECTION IN PART

STATEMENT REGARDING FEDERALLY-SPONSORED RESEARCH OR DEVELOPMENT

Figure 1:
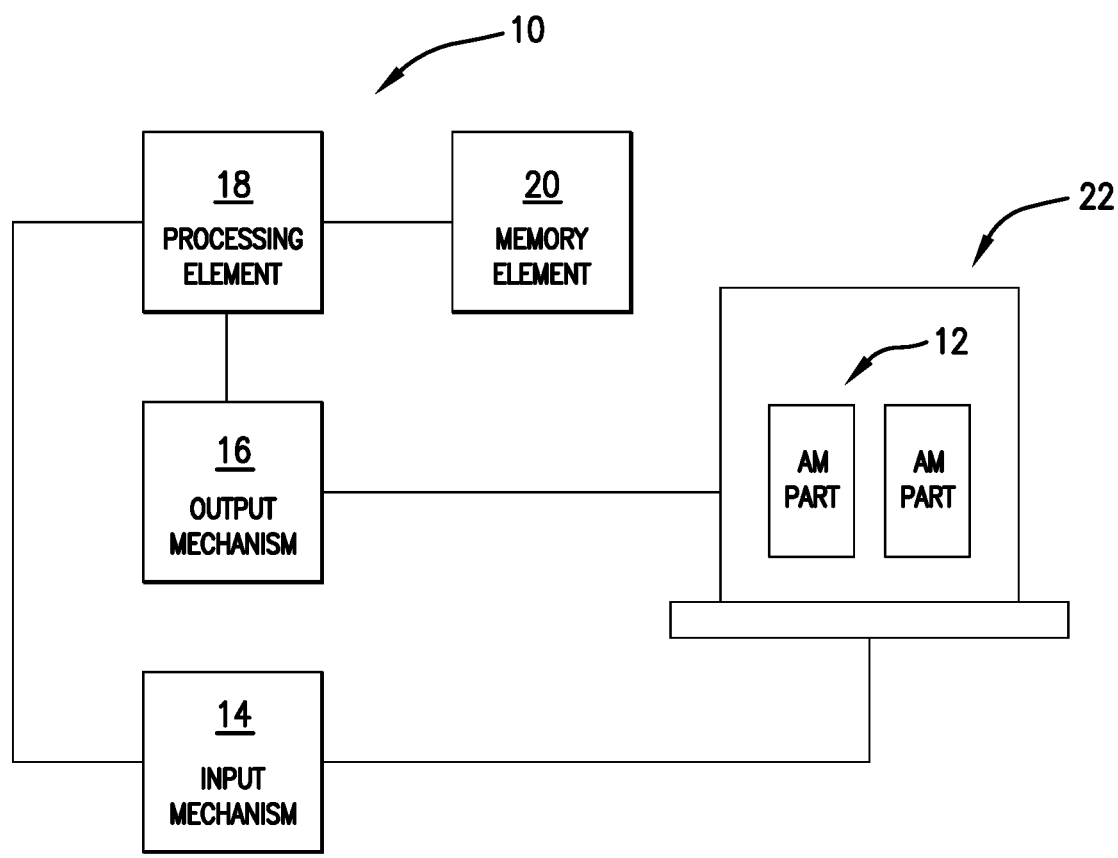

This invention was made with Government support under Contract No.: DE-NA-0002839 awarded by the United States Department of Energy/National Nuclear Security Administration. The Government has certain rights in the invention.

BACKGROUND

Parts made via additive manufacturing processes must be tested to ensure quality control and to quantify the quality of the parts. The quality and acceptability of additively manufactured parts may depend on various process parameters. For example, in selective laser melting (SLM) or electron beam melting (EBM), critical process parameters include powder characteristics and equipment setup parameters. Material properties may depend on the equipment setup parameters, such as scan speed and beam power. Therefore, the material properties of each additively manufactured part may be unique because density, microstructure, and mechanical properties are dependent on both powder characteristics and process parameters. Powder can be inspected and process parameters can be specified, but determining their cumulative effect on a part's material properties often requires destructive testing of the part to confirm those properties. Particularly, to determine an amount of excess powder trapped within a set of parts often requires breaking apart a sample part.

Current solutions for non-destructive testing involve x-ray computed tomography, which is expensive and time consuming and is ineffective at testing a plurality of parts at once and/or testing parts on the build platform, so each part must be removed from a build platform and individually tested. Further, the microwaves employed for x-ray computed tomography often fail to sufficiently penetrate parts that are large or that include dense material.

The background discussion is intended to provide information related to the present invention which is not necessarily prior art.

SUMMARY OF THE INVENTION

The present invention solves the above-described problems and other problems by providing systems and methods of non-destructive testing of an additively manufactured part that efficiently and quickly detect and predict the presence and amount of excess powder in the part.

A method according to an embodiment of the present invention comprises (a) exciting, via an input mechanism, the part by using an excitation force to induce a dynamic response in the part; (b) sensing, via an output mechanism, the dynamic response in the part; and (c) comparing, via a processing element, the dynamic response with a reference to identify an indication of excess powder in the part.

A system constructed according to an embodiment of the present invention tests a part manufactured using an additive manufacturing process. The system broadly comprises an input mechanism, an output mechanism, and a processing element. The input mechanism is configured to excite with an excitation force the part to induce a dynamic response in the part. The output mechanism is configured to sense the dynamic response of the part. The processing element is configured to compare the dynamic response to a reference in order to identify an indication of excess powder in the part.

A method of testing parts according to another embodiment of the invention comprises (a) exciting, via an input mechanism, an additive manufacturing build platform on which the parts are located by using an excitation force to induce dynamic responses in each of the parts; (b) sensing, via an output mechanism, the dynamic responses of each of the parts; and (c) comparing, via a processing element, the dynamic responses of each of the parts with a reference to identify an indication of excess powder in the parts.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Figure 2:
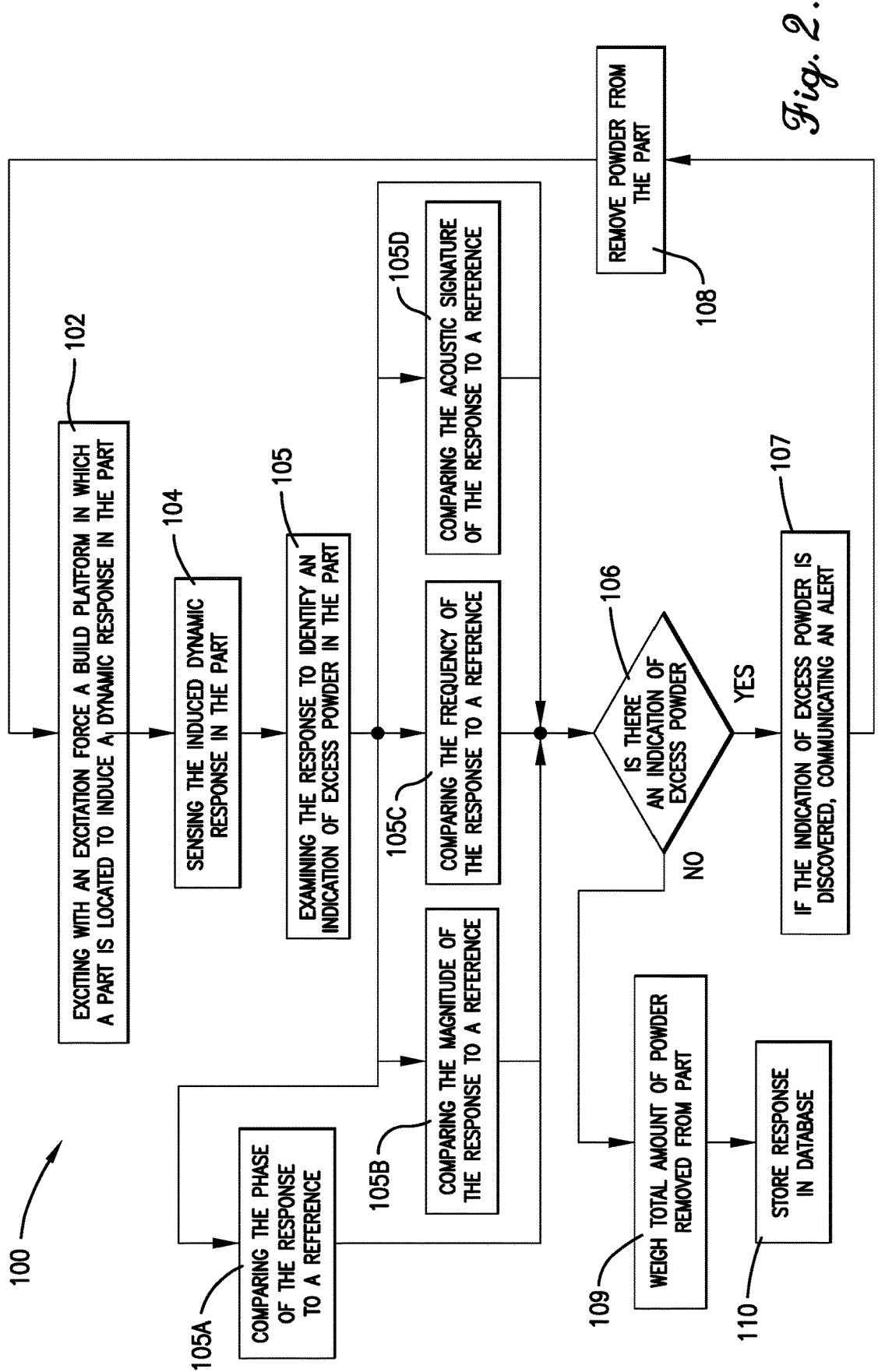

Embodiments of the present invention are described in detail below with reference to the attached drawing figures, wherein:

FIG. 1 is a block diagram of a system constructed in accordance with an embodiment of the present invention; and FIG. 2 is a flowchart of a method practiced in accordance with an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Broadly characterized, the present invention provides a system and method for the non-destructive testing of additively manufactured parts by exciting an additive manufacturing build platform to induce a dynamic response in the parts located on the build platform, sensing the vibration-induced dynamic response, and comparing the dynamic response to a reference to detect excess powder in the parts. As used herein and throughout the present application, "reference" may refer to a recorded response of a part with a known amount of excess powder, including no excess powder, an acceptable weight of excess powder, or an amount that exceeds a threshold. The recorded response may be in the form of a digital file representative of the detected response of the part with the known amount of excess powder. The pre-established reference may also be established by intentionally manufacturing a part with a known amount of excess powder using the additive manufacturing process, examining the determined relationships to identify the indication of the excess powder, and basing the pre-established reference and detection threshold on the identified indication. Additionally or alternatively, the pre-established references may also be based on models and simulations of a reference part.

In implementations, the testing may be performed in-situ or near in situ. A part may be excited by introducing vibration excitation directly into the build platform, thereby avoiding direct contact with the part and avoiding introducing external damping or other influences on the part's response. Exciting the build platform may be accomplished using impulsive excitation (e.g., by application of an impact hammer or projectile to the build platform), swept sinusoid, a pneumatic device (such as an air horn), a speaker, ultrasonic vibrations, or random input vibrations applied to the additive manufacturing build platform so as to generate the dynamic response. Sensing the dynamic frequency response of the parts may be accomplished using non-contact motion transducers. Using non-contact motion transducers facilitates detecting modes that are highly damped and modes with low radiation efficiency, and again avoiding introducing external damping. Alternatively, the dynamic response may be measured with an acoustic or ultrasonic transducer. In some embodiments, a plurality of parts may be excited on the build platform, and the sensing may be accomplished with plurality of transducers or sensors, at least one for each of the plurality of parts, for sensing the responses of each individual part.

The part's response to the vibration excitation may be determined by the part's geometry (e.g., shape, dimensions), material properties (e.g., density, elasticity, internal damping), and the presence of excess powder therein. The presence of excess powder may affect the dynamic response of the vibrationally excited part, and such effects may include the frequency at which the part resonates, the amplitude of the response at resonance, the phase of the response relative to the excitation, the coherence function, and/or the time delay.

The frequency response function (FRF) may be computed between the known input excitation force and the output dynamic response computed in the frequency domain. The frequency, amplitude, and phase of the part may be compared to a reference FRF or just a reference dynamic response measured in a part having known amounts of excess powder or predicted from modelling and simulating parts with a known amount of excess powder. For example, peaks in the measured FRF for the newly created part may be compared to peaks in the reference FRF for a known part. Deviation of the measured FRF from the reference FRF by more than an allowable threshold may be interpreted as evidence of excess powder and, potentially, an unacceptable part.

In one implementation, the amount of excess powder in the parts may be directly measured using a phase relationship between the input force and the measured response (i.e., the phase of the frequency response function). In particular, the additive manufacturing build platform may be vibrated, and the amplitude and phase of the frequency response function may be determined and used to assess the amounts of excess powder in the parts. Deviations of the actual response from the reference response which are greater than a pre-established allowable threshold may be used to identify parts with unacceptable amounts of excess powder. The allowable threshold may be pre-established by intentionally deviating additive manufacturing process parameters from ideal settings in order to produce reference part specimens with known unacceptable amounts of excess powder and measuring their actual frequency response characteristics. Additionally, or alternatively, the allowable threshold may be pre-established using modelling and simulation of parts with no excess powder.

Referring to FIGS. 1, a system 10 for the non-destructive testing of one or more parts 12 manufactured using an additive manufacturing process may broadly comprise an input mechanism 14, an output mechanism 16, a processing element 18, and a memory element 20 configured to perform as follows. The input mechanism 14 may be configured to excite with an excitation force an additive manufacturing build platform 22 on which the part 12 is located to induce a dynamic response in the part 12. The excitation force may be, for example, impulsive vibrations, swept sinusoid vibrations, and random input vibrations. The input mechanism 14 may excite the build platform 22 by introducing the excitation force directly to the build platform 22 so as to introduce the excitation force indirectly to the part 12 located on the build platform 22.

The output mechanism 16 may be configured to sense the induced dynamic response in the part 12. The output mechanism 16 may directly or indirectly measure a mechanical or other response of the part 12. In other words, the output mechanism 16 may be in contact with the part 12, or the output mechanism 16 may be a non-contact device in which it is not touching the part 12, such as a non-contact transducer.

The processing element 18 may be configured to examine the dynamic response to identify any indication of excess powder in the part 12. The processing element 18 may be any suitable electronic or other device configurable to perform the functions described herein. The processing element 18 may include processors, microprocessors (single-core and multi-core), microcontrollers, DSPs, field-programmable gate arrays (FPGAs), analog and/or digital application-specific integrated circuits (ASICs), or the like, or combinations thereof. The processing element 18 may generally execute, process, or run instructions, code, code segments, software, firmware, programs, applications, apps, processes, services, daemons, or the like. The processing element 18 may also include hardware components such as finite-state machines, sequential and combinational logic, and other electronic circuits that can perform the functions necessary for the operation of the current invention. The processing element 18 may be in communication with the other electronic components through serial or parallel links that include address busses, data busses, control lines, and the like.

The processing element 18 may be configured to determine one or more relationships between the dynamic response output and the excitation force input. The processing element 18 may be configured to examine the relationship between the dynamic response output and the excitation force input to identify an indication of excess powder in the part 12. This may include comparing one or more aspects of the response to a reference stored in the memory element 20. In some embodiments, the processing element 18 may be configured to predict an amount of excess powder in the part 12 based at least in part on its response and the reference. For example, the processing element 18 may be configured to retrieve one or more values associated with a reference with a known amount of excess powder form the memory element 20 and compare the response of the part 12 with the reference. If a difference between the response and the reference is below a predetermined threshold, the processing element 18 may be configured to predict an amount of excess powder in the part 12.

The memory element 20 may include data storage components, such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 20 may be embedded in, or packaged in the same package as, the processing element 18. The memory element 20 may include, or may constitute, a "computer-readable medium". The memory element 20 may store the instructions, code, code segments, software, firmware, programs, applications, apps, services, daemons, or the like that are executed by the processing element 18.

In one implementation, the processing element 18 may be configured to compare a phase of the determined relationship to a reference to identify the indication of the defect. For example, the processing element 18 may be configured to compare a phase shift of the response relative to the excitation force to a reference. The reference may be a response from a part 12 that had no excess powder in it or that had an acceptable amount of excess powder. Alternatively or additionally, the reference may be a response of a part 12 that had a known amount of excess powder in it.

In another implementation, the processing element 18 may be configured to compare a magnitude of the determined relationship to a reference to identify the indication of excess powder. The processing element 18 may be further configured to identify the indication of the excess powder in an internal damping characteristic of the part 12.

In yet another implementation, the processing element 18 may be configured to compare the frequency of the dynamic response to a reference to identify the indication of excess powder or compare the acoustic signature of the dynamic response to a reference.

If the indication of excess powder is identified, then the processing element 18 may be configured to cause an alert to be communicated. If the indication of excess powder is discovered, at least a portion of the excess powder may be removed from the part 12. After the excess powder is removed from the part 12, the system 10 may be operable repeat one or more of its functions, such as inducing the response in the part 12 again. The system 10 may be operable to repeat the functions any number of times until the processing element 18 determines that there is no indication of excess powder in the part 12.

If there is no indication of excess powder in the part 12, the total excess powder may be weighed. The processing element 18 may be configured to store a numerical value representative of the weight of the excess powder removed from the part 12 in the memory element 20. The processing element 18 may be configured to store the weight in association with the part 12 type, the phase, the magnitude or amplitude, the frequency, and/or the acoustic signature of the response. These stored values may then be used as a reference for future testing of parts 12. In some embodiments, the excess powder may be removed and weighed once detected, and the determined weights may be added.

The system 10 may be used to inspect one part at a time or to simultaneously inspect a plurality of parts located on the build platform. The system 10 may be used as or as a step in an initial or intermediate screening process to identify problems in the additive manufacturing process, and if a problem is found, the parts may then be subjected to a more extensive inspection. The system 10 may be used to test a part before it is removed from the build platform. For example, the build platform itself may be installed in a test apparatus that implements the present invention. Following testing, the part may be removed from the build platform.

The flow chart of FIG. 2 depicts the steps of an exemplary method 100 of detecting the presence of excess powder. In some alternative implementations, the functions noted in the various blocks may occur out of the order depicted in FIG. 2. For example, two blocks shown in succession in FIG. 2 may in fact be executed substantially concurrently, or the blocks may sometimes be executed in the reverse order depending upon the functionality involved. In addition, some steps may be optional.

The method 100 is described below, for ease of reference, as being executed by exemplary devices and components introduced with the embodiments illustrated in FIG. 1. The steps of the method 100 may be performed by the system 10 through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium(s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 102, the input mechanism 14 may be configured to excite with an excitation force an additive manufacturing build platform 22 on which the part 12 is located to induce a dynamic response in the part 12. The excitation force may be, for example, impulsive vibrations, swept sinusoid vibrations, and random input vibrations. The input mechanism 14 may excite the build platform 22 by introducing the excitation force directly to the build platform 22 so as to introduce the excitation force indirectly to the part 12 located on the build platform 22.

Referring to step 104, the output mechanism 16 may be configured to sense the induced dynamic response in the part 12. The output mechanism 16 may directly or indirectly measure a mechanical or other response of the part 12. In other words, the output mechanism 16 may be in contact with the part 12, or the output mechanism 16 may be a non-contact device in which it is not touching the part 12, such as a non-contact transducer.

Referring to step 105, the processing element 18 may be configured to examine the dynamic response to identify any indication of excess powder in the part 12. This step 105 may include determining one or more relationships between the dynamic response output and the excitation force input. The processing element 18 may be configured to examine the relationship between the dynamic response output and the excitation force input to identify an indication of excess powder in the part 12. This step 105 may include comparing one or more aspects of the response to a reference stored in the memory element 20. In some embodiments, this step 105 may include the processing element 18 predicting an amount of excess powder in the part 12 based at least in part on its response and the reference. For example, the processing element 18 may be configured to retrieve one or more values associated with a reference with a known amount of excess powder form the memory element 20 and compare the response of the part 12 with the reference. If a difference between the response and the reference is below a predetermined threshold, the processing element 18 may be configured to predict an amount of excess powder in the part 12.

Referring to step 105A, the processing element 18 may be configured to compare a phase of the determined relationship to a reference to identify the indication of the defect. For example, the processing element 18 may be configured to compare a phase shift of the response relative to the excitation force to a reference. The reference may be a response from a part 12 that had no excess powder in it or that had an acceptable amount of excess powder. Alternatively or additionally, the reference may be a response of a part 12 that had a known amount of excess powder in it.

Referring to step 105B, the processing element 18 may be configured to compare a magnitude of the determined relationship to a reference to identify the indication of excess powder. The processing element 18 may be further configured to identify the indication of the excess powder in an internal damping characteristic of the part 12.

Referring to step 105C, the processing element 18 may be configured to compare the frequency of the dynamic response to a reference to identify the indication of excess powder.

Referring to step 105D, the processing element may be configured to compare the acoustic signature of the dynamic response to a reference.

Referring to steps 106 and 107, if the indication of excess powder is identified, then the processing element 18 may be configured to cause an alert to be communicated. The processing element 18 may be configured to send a signal representative of the alert to a user interface or an external device.

Referring to step 108, if the indication of excess powder is discovered, at least a portion of the excess powder may be removed from the part 12. After the excess powder is removed from the part 12, the method 100 may repeat one or more of the previous steps, such as inducing the response in the part 12 again, as shown in step 102. The method 100 may be repeated any number of times until the processing element 18 determines that there is no indication of excess powder in the part 12 during step 105.

Referring to steps 106 and 109, if there is no indication of excess powder in the part 12, the total excess powder may be weighed.

Referring to step 110, the processing element 18 may be configured to store a numerical value representative of the weight of the excess powder removed from the part 12 in the memory element 20. The processing element 18 may be configured to store the weight in association with the part 12 type, the phase, the magnitude or amplitude, the frequency, and/or the acoustic signature of the response. These stored values may then be used as a reference for future testing of parts 12. In some embodiments, the excess powder may be removed subsequent to step 108, and step 109 may comprise adding the weight of the excess powder removed subsequent to step 108.

The method 100 may be used to inspect one part at a time or to simultaneously inspect a plurality of parts located on the build platform. The method 100 may be used as or as a step in an initial or intermediate screening process to identify problems in the additive manufacturing process, and if a problem is found, the parts may then be subjected to a more extensive inspection. The method 100 may be used to test a part before it is removed from the build platform. For example, the build platform itself may be installed in a test apparatus that implements the present invention. Following testing, the part may be removed from the build platform.

The method 100 may include additional, less, or alternate steps and/or device(s), including those discussed elsewhere herein. For example, one or more of the operating conditions may be transmitted, via the communication element, to an external device.

Applications of embodiments of the present invention may include inspecting metal parts produced using additive manufacturing processes in, e.g., the Nuclear Security Enterprise and/or the defense and aerospace industry. Additional applications include inspecting other high precision/high quality components, including those produced using conventional machining techniques, including non-metallic parts. Some such parts may be supported during impact to minimize the amount of damping imparted to the system.

Embodiments of the present invention may be adopted into one or more commonly accepted test standards, such as ASTM WK47031, New Guide for Nondestructive Testing of Additive Manufactured Metal Parts Used in Aerospace Applications; F2971-13, Standard Practice for Reporting Data for Test Specimens Prepared by Additive Manufacturing; F3122-14 Standard Guide for Evaluating Mechanical Properties of Metal Materials Made via Additive Manufacturing Processes; and ISO I ASTM52921-13, Standard Terminology for Additive Manufacturing-Coordinate Systems and Test Methodologies.

The present invention provides several advantages over prior art processes. Unlike prior art processes, the present invention may not simply evaluate the amplitude of the measured dynamic response, but rather it may evaluate the relationships between the output responses and the input excitation. The phase of the determined relationships is sensitive to the damping in the system. Failure modes anticipated in additively manufactured parts are expected to affect internal damping, non-linearity, and reflections. In addition, the present invention may minimize or limit the amount of external damping imparted to the part being tested, including minimizing various forms of friction that might otherwise dissipate energy. This may be accomplished, for example, by supporting the build platform on air bearings, and/or using a non-contact transducer as the output mechanism. Using a measure sensitive to system damping and controlling external damping facilitates discriminating between good parts and bad parts based on system damping.

The present invention may directly measure the mechanical response of the part, and not just the radiated acoustic field, so that modes with low radiation efficiency will still be detected, and the measurements can be performed in a production environment in the presence of high levels of background noise.

The present invention may not input energy directly into the parts being tested. Inputting energy directly into the parts requires adjusting for the size and shape of each part being tested. The present invention may input energy directly into the standard build plate used in additive manufacturing, which means that any part produced on a particular additive manufacturing machine can be tested without requiring any adjustments to excite the plate.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim (s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of testing a part manufactured using an additive manufacturing process, the method comprising:
   (a) exciting, via an input mechanism, the part by using an excitation force to induce a dynamic response in the part;
   (b) sensing, via an output mechanism, the dynamic response in the part;
   (c) comparing, via a processing element, the dynamic response with a reference to identify an indication of excess powder in the part;
   (d) removing portions of the excess powder if the indication of excess powder is identified;
   (e) repeating steps (a) through (d) until no indication of excess powder is identified;
   (f) weighing the excess powder removed from the part;
   (g) storing, via a memory element, a numerical value representative of a weight of the excess powder removed in association with the dynamic response of the part;
   (h) repeating steps (a) through (c) with a second part; and
   (i) predicting a weight of excess powder in the second part based at least in part on the numerical value representative of the weight of the excess powder removed and the dynamic response of the second part.

2. The method of claim 1, wherein step (c) comprises comparing a characteristic of the dynamic response to a corresponding characteristic of the reference.

3. The method of claim 2, wherein the characteristic comprises at least one of a phase, a magnitude, a frequency, or an acoustic signature.

4. The method of claim 1, further comprising communicating, via the processing element, an alert if the indication of excess powder is identified.

5. The method of claim 1, wherein step (a) comprises exciting a build platform supporting a plurality of parts.

6. The method of claim 5, wherein step (b) comprises sensing dynamic responses of each of the plurality of parts.

7. A system for testing parts manufactured using an additive manufacturing process, the system comprising:
   an additive manufacturing build platform configured to support the parts;
   an input mechanism configured to excite with an excitation force the additive manufacturing build platform to induce dynamic responses in the parts;
   an output mechanism configured to sense the dynamic responses in each of the parts; and
   a processing element configured to compare the dynamic responses to a reference in order to identify an indication of excess powder in the parts,
   wherein the processing element is further configured to:
      receive a signal representative of a weight of excess powder removed from at least one of the parts,
      store on a memory element a numerical value representative of the weight of the excess powder removed in association with the dynamic response of the at least one of the parts,
      compare dynamic responses of a second set of parts received from the input mechanism with the reference to identify an indication of excess powder in the second set of parts, and
      predict a weight of excess powder in the second set of parts based at least in part on the numerical value representative of the weight of the excess powder removed and the dynamic responses of the second set of parts.

8. The system of claim 7, wherein the input mechanism is configured to excite the parts simultaneously, and the output mechanism is configured to sense dynamic responses of each of the parts.

9. The system of claim 7, wherein the processing element is configured to compare a characteristic of the dynamic responses to a corresponding characteristic of the reference.

10. The system of claim 9, wherein the characteristic of the induced dynamic response comprises at least one of a phase, a magnitude, a frequency, or an acoustic signature.

11. A method of testing parts manufactured using an additive manufacturing process, the method comprising:
   (a) exciting, via an input mechanism, an additive manufacturing build platform on which the parts are located by using an excitation force to induce dynamic responses in each of the parts;
   (b) sensing, via an output mechanism, the dynamic responses of each of the parts;
   (c) comparing, via a processing element, the dynamic responses of each of the parts with a reference to identify an indication of excess powder in the parts;

(d) removing portions of the excess powder if the indication of excess powder is identified;
(e) repeating steps (a) through (d) until no indication of excess powder is identified;
(f) weighing the excess powder removed from at least one of the parts;
(g) storing, via a memory element, a numerical value representative of a weight of the excess powder removed in association with the dynamic response of the at least one of the parts;
(h) repeating steps (a) through (c) with a second set of parts; and
(i) predicting a weight of excess powder in the second set of parts based at least in part on the numerical value representative of the weight of the excess powder removed and the dynamic responses of the second set of parts.

12. The method of claim 11, further comprising storing, via a memory element, the dynamic responses of the parts if the indication of excess powder is not identified.

* * * * *